United States Patent Office 3,172,822
Patented Mar. 9, 1965

3,172,822
PROCESS FOR PREPARING 6-DEMETHYL-TETRACYCLINES
Saul L. Neidleman, Highland Park, N.J., assignor to Olin Mathieson Chemical Corporation, New York, N.Y., a corporation of Virginia
No Drawing. Filed Oct. 31, 1960, Ser. No. 65,928
2 Claims. (Cl. 195—80)

This invention relates to an improved process for the production of 7-chloro-6-demethyltetracline and, more particularly, to an improvement in the process of producing 7-chloro-6-demethyltetracycline by culturing 7-chlorotetracycline-producing strains of Streptomyces.

Prior to the present invention, 7-chloro-6-demethyltetracycline has been produced by culturing selected mutant strains of S. aureofaciens in contact with nutrient media of varying compositions. The antibiotic thus produced is characterized by extreme chemical stability, notably in strong acid and alkalai solutions, and by its increased retention in the circulatory system of man. Hence, the therapeutic importance of the 7-chloro-6-demethyltetracycline is unquestionable. It is, therefore, desirable that the simplest and most effective procedures for the production of this antibiotic be provided. This means, of course, that it is highly desirable to achieve the production of 7-chloro-6-demethyltetracycline with a minimum of restriction on the source of microorganism which can be employed and without the burden of selecting particular strains of microorganisms for use in the fermentation process for producing 7-chloro-6-demethyltetracycline.

It has been found in accordance with the present invention that 7-chloro-6-demethyltetracycline can be produced in good yield from any 7-chlorotetracycline-producing strain of Streptomyces when ethionine or ethionine sulfoxide is added to a growing culture of a 7-chlorotetracycline-producing strain of Streptomyces. The ethionine component may be in the form of DL-ethionine, D-ethionine or L-ethionine.

Among the tetracycline producing strains of Streptomyces which have been successfully employed in the preparation of 7-chloro-6-demethyltetracycline by the novel process of the present invention are the following: S. aureofaciens ATCC 13899; S. aureofaciens ATCC 13900; S. aureofaciens ATCC 12416a; S. aureofaciens ATCC 12416b; S. aureofaciens ATCC 12416c; S. aureofaciens NRRL B 1288; S. aureofaciens NRRL 2209; S. aureofaciens NRRL B 1286; S. aureofaciens NRRL B 1287; and S. viridofaciens ATCC 11989.

The fermentation procedure employed in the novel process of the present invention may be carried out in accordance with the conditions generally employed in the production of tetracycline. Thus, the nutrient medium, conditions of time, temperature and pH control, aeration, and the like will conform to those employed in the production of tetracycline as set out in U.S. Patent No. 2,734,018.

When a fermentation medium low in biologically available chloride, that is, a medium containing only such chloride as is normally present as a constituent of one of the components of the medium, is employed, variable amounts of tetracycline and 7-chlorotetracycline will form in addition to the desired 7-chloro-6-demethyltetracycline.

If a source of biologically available chloride is included in the fermentation medium, then 7-chlorotetracycline will form to the near exclusion of tetracycline. In order to form 7-chloro-6-demethyltetracycline in substantial yield under such conditions where DL-ethionine or DL-methionine sulfoxide is used, it has been found necessary to include DL-methionine or DL-methionine sulfoxide in the fermentation, together with the DL-ethionine or DL-ethionine sulfoxide.

The following examples are illustrative of the practice of this invention.

Example 1

A culture of Streptomyces aureofaciens (ATCC 13900) is grown in approximately 50 ml. of an aqueous medium containing, per 1000 ml., 30 gms. extraction process soybean meal, 50 gms. glucose and 7 gm. calcium carbonate in a 250 ml. Erlenmeyer flask. The flask is agitated on a rotary shaker (280 cycles per minute) in a room maintained at 25° C. for a period of 72 hours. 10% of the resulting inoculum is then transferred to a 250 ml. Erlenmeyer flask containing 50 ml. of the medium employed above and the flask agitated a further 72 hours under the same conditions. 1 ml. of the resulting inoculum is then employed for the inoculation of 10 ml. of an aqueous medium containing, per 1000 ml., 30 gms. extraction process soybean meal, 50 gms. glucose and 7 gms. calcium carbonate, in a 1″ x 6″ test tube. 1 ml. of a sterile solution of DL-ethionine containing 1 mg./ml. is added to the tube and the tube is shaken on a rotary shaker at 280 cycles per minute at 25° C. for seven days. The contents of the tube were then acidified to pH2 by the addition of sulfuric acid and centrifuged. Examination of the supernatant liquid by paper chromatography employing the methods of Bohonos et al. (Antibiotics Annual 1953–4, page 49) demonstrates the presence of 7-chloro-6-demethyltetracycline, 7-chloro-tetracycline and tetracycline.

Example 2

The procedure of Example 1 is carried out except that 1 ml. of a solution containing 5 mg./ml. of DL-ethionine sulfoxide is used in place of DL-ethionine. Examination of the supernatant liquid by the paper chromatographic method employed in Example 1 shows the presence of 7-chloro-6-demethyltetracycline in the product which is obtained.

Example 3

A culture of Streptomyces aureofaciens (ATCC 13900) is grown in approximately 50 ml. of an aqueous medium containing, per 1000 ml., 30 gms. extraction process soybean meal, 50 gms. glucose and 7 gm. calcium carbonate in a 250 ml. Erlenmeyer flask. The flasks are agitated on a rotary shaker (280 cycles per minute) in a room maintained at 25° C. for a period of 72 hours. A 10% transfer of the resulting inoculum is made to a 250 ml. Erlenmeyer flask containing 50 ml. of the medium employed above and the flask is agitated under the same conditions for an additional 72 hour period. 1 ml. of the resulting inoculum is then employed for the inoculation of 10 ml. of an aqueous medium containing, per 1000 ml., 30 gms. extraction process soybean meal, 50 gms. glucose, 1 gm. sodium chloride and 7 gms. calcium carbonate in a 1″ x 6″ test tube. 1 ml. of a sterile solution of DL-ethionine containing 1 mg./ml. is added to the tube and the tube is shaken on a rotary shaker at 280 cycles per minute at 25° C. for seven days. The contents of the tube were then acidified to pH 2 by the addition of sulfuric acid and centrifuged. Examination of the supernatant liquid by paper chromatography employing the methods of Bohonos et al. (Antibiotics Annual 1953–54, page 49) demonstrates the presence of 7-chlorotetracycline and minor amounts of tetracycline.

Example 4

A culture of Streptomyces aureofaciens (ATCC 13900) is grown in approximately 50 ml. of an aqueous medium containing, per 1000 ml., 30 gms. extraction process soybean meal, 50 gms. glucose and 7 gm. calcium carbonate in a 250 ml. Erlenmeyer flask. The flasks are agitated on a rotary shaker (280 cycles per minute) in a room maintained at 25° C. for a period of 72 hours. A 10% transfer of the resulting inoculum is made to a 250 ml. Erlenmeyer flask containing 50 ml. of the medium employed above and the flask is agitated under the same conditions for an additional 72 hour period. 1 ml. of the resulting inoculum is then employed for the inoculation of 10 ml. of an aqueous medium containing, per 1000 ml., 30 gms. extraction process soybean meal, 50 gms. glucose, 1 gm. sodium chloride and 7 gms. calcium carbonate in a 1" x 6" test tube. 1 ml. of a sterile solution of DL-ethionine containing 1 mg./ml. and 1 ml. of a sterile solution of DL-methionine containing 1 mg./ml. is added to the tube and the tube is shaken on a rotary shaker at 280 cycles per minute at 25° C. for seven days. The contents of the tube were then acidified to pH 2 by the addition of sulfuric acid and centrifuged. Examination of the supernatant liquid by paper chromatography employing the methods of Bohonos et al. (Antibiotics Annual 1953–54, page 49) demonstrates the presence of 7-chloro-6-demethyltetracycline, 7-chlorotetracycline and tetracycline.

Example 5

To a 250 ml. Erlenmeyer flask containing 50 ml. of an aqueous medium containing, per 1000 ml., 30 gms. extraction process soybean meal, 50 gms. glucose, 7 gms. calcium carbonate and 1 gm. sodium chloride there is added 5 ml. of a sterile solution of DL-ethionine and DL-methionine containing 1 mg./ml. of each compound and 1 ml. of an inoculum of *S. aureofaciens* (ATCC 13900) prepared as in Example 1. The flask is shaken on a rotary shaker at 280 cycles per minute at 25° C. for seven days. The contents of the flask are then acidified to pH 2.0 with sulfuric acid. The mixture is stirred for 15 minutes and filtered with the aid of Hyflo. The filtrate is adjusted to pH 9.0 with sodium hydroxide and extracted with three 350 ml. portions of n-butanol. The solvent phase is acidified to pH 2.2 with sulfuric acid and allowed to stand in the cold room for 65 hours. The solvent phase is then filtered and upon chromatographic examination in accordance with the procedure employed in Example 1 the presence of 7-chloro-6-demethyltetracycline, 7-chlorotetracycline and tetracycline is demonstrated.

The n-butanol is then removed under high vacuum at 50° C. The brown viscous residue is suspended in a mixture of 100 ml. distilled water and 10 ml. of concentrated hydrochloric acid and heated at 75° C. for 30 minutes. After cooling, the mixture is adjusted to pH 1.8 with potassium hydroxide and filtered. The filtrate is extracted with 22 ml. of chloroform. The resulting aqueous layer is extracted with 100 ml. n-butanol. The butanol extract, upon chromatographic examination according to the procedure employed in Example 1, demonstrated the presence of 7-chloro-6-demethyltetracycline. Only the slightest traces of other bioactive materials can be noted.

Example 6

A culture of *Streptomyces aureofaciens* (ATCC 13900) is incubated in 50 ml. of an aqueous medium containing, per 1000 ml., 30 gms. extraction process soybean meal, 50 gms. glucose and 7 gms. calcium carbonate, contained in a 250 ml. Erlenmeyer flask for 72 hours at 25° C. on a rotary shaker operated at 280 cycles per minute. The entire contents of the flask are transferred to a 4-liter flask containing 1 liter of the same medium. The resulting medium is incubated for 48 hours at 25° C. on a reciprocating shaker operating at 120 2-inch cycles per minute. At the completion of this incubation period 300 ml. of the resulting mycelial growth is suspended in 1 liter of the original medium. 300 ml. of this inoculum is then employed for the inoculation of 30 liters of the following sterile medium; 5.0% extraction process soybean meal, 5.0% British gum, 0.6% $CaCO_3$, 0.25% Foamex, 0.25% prime burning oil, 0.1% NaCl and sufficient tap water to bring the volume to 30 liters. Prior to inoculation, the medium is supplemented by the addition of 3 gm. DL-ethionine and 3 gm. DL-methionine, each of which has been separately sterilized by heating in 1 liter of water at 121° C. for 45 minutes. The fermentation is then carried out with continuous agitation, at a temperature of 25° C. for six days. During the fermentation the medium is aerated at a superficial air velocity of 0.3 meter/minute for the first 24 hours and at 0.6 meter/minute from 24 hours to harvest.

After six days incubation, the whole broth from the fermentation is acidified to pH 1.5, filtered with the aid of Hyflo, and the cake washed with sufficient water to retain the original volume. 15.6 liters of the acid filtrate containing about 0.6 mg./ml. of a mixture of chlorotetracycline and 7-chloro-6-demethyltetracycline is extracted at pH 9.0–9.5 with 5.3 liters of n-butanol. The solvent phase is acidified to pH 2.0 with 40% $H_2SO_4$ and the solution allowed to stand in the cold room overnight. After clarification, the solvent is removed under high vacuum in the presence of water. The resulting aqueous concentrate is adjusted to pH 2.9 with 40% NaOH and lyophilized. 7 grams of crude mixture is obtained with about 30% of the bio activity of pure 7-chloro-6-demethyltetracycline.

The chlorotetracycline in the product is hydrolyzed with acid under conditions where the 7-chloro-6-demethyltetracycline is found to be relatively stable. 5 g. of the crude concentrate is dissolved in a mixture of 500 ml. $H_2O$ and 50 ml. concentrated HCl. After heating at 75–80° for 30 minutes, the solution is cooled and neutralized to pH 1.8 with 40% NaOH. Decomposition products are removed from the solution by filtration and extraction with 20% (by volume) chloroform. The activity is then extracted from the solution using an equal volume of n-butanol. The butanol extract is concentrated under vacuum in the presence of water and freeze dried. Addition of methanolic HCl yields 200 mg. crystalline 7-chloro-6-demethyltetracycline hydrochloride. Recrystallization from a methanol-isopropyl alcohol mixture yields a product which by analysis contained no C-methyl and gave an infra red spectrum identical to that of 7-chloro-6-demethyltetracycline hydrochloride.

The invention may be variously otherwise embodied within the scope of the appended claims.

I claim:

1. A process for the production of 7-chloro-6-demethyltetracycline which comprises cultivating a 7-chlorotetracycline-producing strain of *Streptomyces aureofaciens* in an aqueous nutrient medium containing an available source of chloride ions under aerobic conditions in the presence of a small but effective amount of a compound selected from the group consisting of ethionine and ethionine sulfoxide and in the further presence of a small but effective amount of a compound selected from the group consisting of methionine and methionine sulfoxide.

2. The process of claim 1 in which the compounds are DL-ethionine and DL-methionine.

References Cited by the Examiner
UNITED STATES PATENTS 2,878,289   3/59   McCormick et al. _____ 195—80

A. LOUIS MONACELL, *Primary Examiner.*

TOBIAS E. LEVOW, ABRAHAM H. WINKELSTEIN,
*Examiners.*